United States Patent [19]

Gueldenzopf

[11] Patent Number: 4,797,221

[45] Date of Patent: Jan. 10, 1989

[54] POLYMER SHEET FOR DELIVERING LAUNDRY CARE ADDITIVE AND LAUNDRY CARE PRODUCT FORMED FROM SAME

[75] Inventor: Thomas D. Gueldenzopf, Racine, Wis.

[73] Assignee: S. C. Johnson & Son, Inc., Racine, Wis.

[21] Appl. No.: 193,205

[22] Filed: May 9, 1988

Related U.S. Application Data

[63] Continuation of Ser. No. 775,298, Sep. 12, 1985, abandoned.

[51] Int. Cl.[4] .......................... A62D 3/00; A62D 9/00; C01B 7/00; C09K 3/00

[52] U.S. Cl. ........................................ 252/95; 252/92; 252/174; 252/186.25; 252/186.34; 252/186.35; 252/186.36; 252/186.37; 252/90; 252/91

[58] Field of Search ................ 252/90, 91, 95, 186.25, 252/186.34, 186.35, 186.36, 186.37

[56] References Cited

U.S. PATENT DOCUMENTS

| | | | |
|---|---|---|---|
| 3,070,583 | 12/1962 | Uraneck et al. | 525/367 |
| 3,186,869 | 6/1965 | Friedman | 252/90 |
| 3,322,674 | 5/1967 | Friedman | 252/90 |
| 3,528,921 | 9/1970 | Gray | 252/99 |
| 3,634,260 | 1/1972 | Pickin | 252/95 |
| 3,658,712 | 4/1972 | Lindner et al. | 252/99 |
| 3,723,323 | 3/1973 | Morgan et al. | 252/90 |
| 3,737,385 | 6/1973 | Werdehausen | 252/102 |
| 3,904,543 | 9/1975 | Knighten | 252/174 |
| 3,912,681 | 10/1975 | Dickson | 524/422 |
| 3,992,317 | 11/1976 | Brichard et al. | 252/186.32 |
| 4,115,292 | 9/1978 | Richardson et al. | 252/90 |
| 4,115,331 | 9/1978 | Tominaga et al. | 524/53 |
| 4,176,079 | 11/1979 | Guerry et al. | 252/90 |
| 4,225,451 | 9/1980 | McCrudden et al. | 252/99 |
| 4,241,141 | 12/1980 | Dill | 428/500 |
| 4,329,244 | 5/1982 | Brichard et al. | 252/99 |
| 4,361,687 | 11/1982 | Arndt et al. | 524/850 |
| 4,416,791 | 11/1983 | Haq | 252/90 |
| 4,433,076 | 2/1984 | Bauer et al. | 523/342 |
| 4,495,367 | 1/1985 | Dammann | 564/208 |
| 4,515,703 | 5/1985 | Haq | 252/92 |
| 4,532,063 | 7/1985 | Gueldenzopf | 252/90 |
| 4,555,354 | 11/1985 | Clarke et al. | 252/90 |
| 4,557,852 | 12/1985 | Schultz et al. | 252/95 |
| 4,563,497 | 1/1986 | Masanek et al. | 524/307 |
| 4,582,625 | 4/1986 | George | 252/93 |
| 4,608,187 | 8/1986 | Chang | 252/90 |
| 4,654,395 | 3/1987 | Schulz et al. | 526/318.42 |

FOREIGN PATENT DOCUMENTS

| | | |
|---|---|---|
| 510555 | 3/1955 | Canada . |
| 1103099 | 6/1981 | Canada . |
| 1505555 | 3/1978 | United Kingdom . |
| 2090603 | 7/1982 | United Kingdom . |

OTHER PUBLICATIONS

*Water Soluble Resins,* Davidson et al., Reinhold Book Corp., N.Y., 1968, pp. 154–190.

*Primary Examiner*—A. Lionel Clingman

[57] ABSTRACT

An addition polymer of a water-insoluble soft monomer, a water-soluble anionic monomer and, optionally, a water-soluble nonionic monomer and water-insoluble hard monomer is neutralized up to 100%, and formed into a sheet. A laundry care additive, as a bleach, may be stored between a pair of opposed heat sealed sheets to provide a laundry care product adapted to be introduced into a laundry wash.

22 Claims, No Drawings

POLYMER SHEET FOR DELIVERING LAUNDRY CARE ADDITIVE AND LAUNDRY CARE PRODUCT FORMED FROM SAME

This is a continuation of co-pending application Ser. No. 06/775,298 filed on Sept. 12, 1985, now abandoned.

BACKGROUND OF THE INVENTION 1. Field of the Invention

This invention relates to a polymeric sheet or carrier capable of storing and delivering to a wash, corrosive laundry care additives. In particular, it relates to a storage-stable sheet for packaging laundry care additives which is soluble in aqueous and detergent solutions.

It has long been desired to provide a single vehicle adapted to permit prepackaging of desired amounts of laundry care additives and for delivering such additives to a washing machine or other laundry water by simply adding a package formed from that vehicle to the wash. Typical washing machine additives include corrosive bleaches, enzymes, fabric softeners, fabric conditioners, wrinkle-release additives, additives for imparting a specific feed (texture) or "hand" to fabrics and detergents. Since many of such additives are not compatible with the skin and become degraded during storage without suitable protection, there has been a continuing problem for storing such additives and for delivering them to a washing machine or the like.

It has been proposed to employ packages comprising water soluble bags containing detergents for laundry use. Such bags are particularly appealing for home use where a measured amount of laundry care additive, such as a bleach or detergent, may be added directly into a laundering machine without waste or mess. Such packages are intended to provide the required amount of laundry care additive for a single filling of that machine.

Until now, however, such packages or other delivery systems have not proved entirely satisfactory. The difficulties in fabricating satisfactory packages have frustrated the art for many years. Sheet material for carrying a laundry care additive must simultaneously satisfy many conflicting requirements. The material must form a self-supporting film which rapidly dissolves or disperses in wash water at temperatures typically from about 60° F. to 140° F.

It has been proposed, for example, in U.S. Pat. No. 3,322,674 to employ polymeric materials having water-solubilizing groups or hydrophilic groups for that purpose. Such dissolvable film forming materials, as poly (vinyl alcohol) or cellulosic derivatives, however, were found to be oxidized by and rendered insoluble by strong laundry care additives, such as chlorine bleaches. Accordingly, it has been proposed to employ a barrier coating on the inside surface of the laundry package to shield the packaging material from the chlorine bleach. However, such packets have not been satisfactory, since upon prolonged storage, the barrier coatings tend to crack or tear and permit the bleach to contact the packaging material. After prolonged contact, the packaging material is oxidized and becomes water insoluble and the chlorine bleach loses its activity.

Conventional solution polymers providing high water solubility and containing from 25-50% of alkali-soluble monomers were once thought to be unsuitable as laundry care packaging material. Films formed from such polymers are usually hygroscopic and, during storage at high relative humidity, tend to lose dimensional stability and become unduly tacky. In addition, at low temperatures and low relative humidity often encountered during storage, such films tend to become unduly brittle. Accordingly, rolls of tear off packages formed from such sheet material may not readily separate by tearing. Further, conventional water-soluble polymers often lose their flexibility, during storage at low temperatures of 0° F. or lower. The present invention overcomes these difficulties and remains relatively stable during these conditions.

Other water soluble, film forming material, such as cellulosic materials, are not easily cast into sheets and are not readily heat sealable. Accordingly, it can be difficult and time consuming to economically utilize such materials.

It is, therefore, a primary object of this invention to provide a polymeric carrier in sheet form capable of retaining a pre-selected amount of a reactive laundry care additive, which carrier is inert and stable to said additive during storage. It is another object of this invention to provide a water-soluble carrier for delivering laundry additive which will dissolve or disperse readily in aqueous or detergent solutions at temperatures from about 60° F. to about 140° F.

It is a further object of this invention to provide a polymeric film which possesses sufficient strength to resist the rigors of mechanical packaging processes, but which retains sufficient flexibility to permit handling without premature rupture or disintegration. A sheet having such properties may generally be referred to herein as a self-supporting sheet.

It is a still further object of the present invention to provide a water-soluble polymeric film which resists the destabilizing effects of high humidity.

It is yet another object of the invention to provide a polymeric film which resists embrittlement at low relative humidity or at low temperatures.

It is an additional object of the invention to provide a laundry care sheet for retaining and delivering particulate bleaches to a laundry wash.

It is a further object of this invention to provide a water-soluble polymer having improved and superior stability in the face of corrosive laundry care additives.

Other objects of the invention will be apparent to those skilled in the art from a reading of the detailed description of the preferred embodiment of the invention.

DESCRIPTION OF THE PRIOR ART

Schulz et al., U.S. Ser. No. 598,103, filed Apr. 4, 1984 discloses an addition polymer of a water-insoluble soft monomer, a water-soluble anionic monomer and, optionally, a water-soluble nonionic monomer and water-insoluble hard monomer. The polymer thereby formed is neutralized to at least about 75% of stoichiometric and formed into a sheet. A particulate laundry care additive, as a bleach, may be stored between a pair of opposed heat sealed sheets to provide a laundry care product adapted to be introduced into a laundry wash.

The composition of Schulz et al. differs from the present invention in that the present invention is neutralized to 100% of stoichiometric, the water-insoluble soft monomer is optional, and the amount of anionic monomer present in the instant invention is outside the ranges of Schulz et al. It was found that by altering the composition to the present invention, the problem of stability of bleach, which handicaps the Schulz disclosure, has been overcome and that more bleach may be delivered to the washing lrquor by the present invention than by Schulz because the polymer is more inert to chlorine bleach than in Schulz et al. Thus, the present invention differs from, and is an unobvious improvement over Schulz et al.

SUMMARY OF THE INVENTION

The above and other objects are met in a water-soluble sheet for delivering laundry additive which comprises a self-supporting film of an addition polymer formed from:

(a) from about 0 to 85% by weight of a water-insoluble soft monomer;
(b) from about 15 to 100% by weight of a water-soluble anionic monomer;
(c) from about 0 to 25% by weight of a water-soluble nonionic monomer; and
(d) from about 0 to 40% by weight of a water-insoluble hard monomer.

This addition polymer is neutralized to up to 100% of theoretical employing a Group IA metal base or a Group IA metal basic salt when anionic monomer is present in amounts of 15 to 100%. The polymer has a molecular weight of at least 25,000, preferably over 50,000, and most preferably over 100,000.

It has been found that such acrylic polymers possess unusual stability towards reactive laundry care additives, including particulate chlorine bleaches. Such polymers also possess sufficient mechanical strength to be formulated into sheets for laundry care products and can be formulated to maintain their integrity over a broad range of temperature and humidity.

The polymers of the invention are readily prepared by conventional free-radical polymerization. Sheets formed from acrylic polymers are readily heat sealed to provide storage stable products. In addition, the polymer sheet is not substantive to conventional fibers and is inert to conventional laundry additives.

A laundry care product is provided which may have a particulate laundry care additive carried within the sheet of the invention or the laundry care product may be a multitude of small wafers distributed within the sheet. In one aspect the product is a uniformly dispersed particulate layer of laundry care additive contained within a unit formed by the sheet of the invention and in others, it assumes the wafers within the sheets. The product is produced, for example, by forming a unit including a dispersed layer of laundry care additive and at least one sheet of the invention and then sealing the unit.

Since the sheet form of the laundry care product contains the bleach as physically separated particles, or wafers, this invention offers the following advantages over water-soluble bags:

(1) clumping of the active ingredient is not possible;
(2) there can be more controlled metering of the dissolving bleach;
(3) spot damage to the fabrics is minimized.

DETAILED DESCRIPTION OF THE INVENTION

The addition polymers of the invention utilize a soft, water-insoluble monomer. Suitable polymerizable monomers, which form soft, water-insoluble polymers in the presence of free-radical catalysts include primary and secondary alkyl acrylates, having alkyl substituents with up to 18 or more carbon atoms; primary or secondary alkyl methacrylates having alkyl substituents of 5 to 18 or more carbon atoms or other ethylenically-unsaturated compounds which are polymerizable with free-radical catalysts to form soft, solid polymers. Other typical soft monomers of the invention include: vinyl esters of saturated monocarboxylic acids, olefin monomers, such as ethylene and propylene, and conjugated dienes forming rubbery latices such as butadiene, chloroprene, isobutene and isoprene.

The preferred soft monomers include alkyl acrylates in which the alkyl group has from 1 to 8 carbon atoms and alkyl methacrylates wherein the alkyl group has from 5 to 18 carbon atoms. Examples of such compounds include: amyl acrylate; 2-ethylhexyl acrylate; octyl acrylate; n-amyl methacrylate; hexyl methacrylate; octyl methacrylate; dodecyl methacrylate and those acrylates or methacrylates with substituted alkyl groups, such as butoxyethyl acrylate or methacrylate.

Best results are obtained, and accordingly, it is especially preferred to employ alkyl acrylates in which the alkyl group has from 1 to 4 carbon atoms. Typical compounds include: methyl acrylate, ethyl acrylate, propyl acrylate and butyl acrylate and prefera acrylate.

The water-soluble anionic monomer which is combined with the water-insoluble soft monomer to form an addition polymer of the invention includes monomers having water or alkali-solubilizing anionic functionalities including carboxyl groups, sulfonic acid groups, sulfate groups, phosphate groups and the like. If desired, monomeric precursors such as acrylamides, maleic anhydride, acrylic esters, acrylonitrile and the like can be employed in the addition reaction under conditions where they form ionizable groups, such as carboxyl groups, in the copolymer.

Monomers containing carboxylic acid are preferred including: maleic acid; fumaric acid; beta-carboxyethylacrylate; itaconic acid and the like. Best results are obtained and, accordingly, it is preferred to employ as the.anionic monomer, methacrylic acid or acrylic acid.

A preferred addition polymer includes an acrylic copolymer formed from a water-insoluble soft monomer such as methyl acrylate, ethyl acrylate, or butyl acrylate and an anionic monomer selected from methacrylic acid, acrylic acid or maleic acid.

The water-soluble nonionic monomer of the invention is employed, when desired, to enhance the dissolvability of the polymer and to permit a reduction in the amount of anionic functionality present in the.polymer. Accordingly, monomers for providing enhanced water solubility, but free from ionizable functionalities, include hydroxyalkyl acrylates and methacrylates containing an alkylene group having from 2 to 6 carbon atoms to which the hydroxy group is attached. Examples of such monomers include 2-hydroxypropyl acrylate, 2-hydroxypropyl methacrylate, and, more preferably, 2-hydroxyethyl acrylate and 2-hydroxy ethyl methacrylate. Other water-soluble nonionic monomers include N-vinylpyrrolidone, vinyl acetate (hydrolyzed), 3-chloro-2-hydroxypropyl acrylate, 6-hydroxyhexyl acrylate, 5,6-dihydroxyhexyl methacrylate and the like.

Addition polymers of the invention incorporating a nonionic monomer include, for example, ethyl acrylate/hydroxyethyl methacrylate/methacrylic acid; methyl acrylate/hydroxyethyl acrylate/methacrylic acid; butyl acrylate/hydroxypropyl methacrylate/methacrylic acid; ethyl acrylate/N-vinyl pyrrolidone/methacrylic acid; butadiene/hydroxyethyl methacrylate/- methacrylic acid and methyl acrylate/acrylamide/-maleic acid.

Preferred polymers of the inventio-n containing non-ionic monomers include: ethyl acrylate/hydroxyethyl methacrylate/methacrylic acid; ethyl acrylate/hydroxyethyl acrylate/methacrylic acid; ethyl acrylate/hydroxyethyl acrylate/acrylic acid; ethyl acrylate/hydroxyethyl methacrylate/acrylic acid and ethyl acrylate/acrylamide/methacrylic acid.

In order to reduce the tendency to develop tack at high relative humidity,, it may be desirable to include a minor amount of a water-insoluble hard monomer in the addition polymer of the invention. Water-insoluble hard monomers of the invention include polymerizable ethylenically unsaturated monomers including: benzyl acrylate or methacrylate, vinyl chloride, chlorostyrene, vinyl acetate and alpha-methylstyrene. A preferred class of water-insoluble hard monomers includes: acrylonitrile; methacrylonitrile and styrene.

Enhanced results have been obtained, and accordingly, it is preferred to employ,as the hard monomer, a $C_1$ to $C_4$ alkyl ethacrylate. Typical examples of such monomers include ethyl methacrylate, propyl methacrylate, isopropyl methacrylate, n-butyl methacrylate and sec-butyl methacrylate. An especially preferred hard monomer is methyl methacrylate.

Examples of preferred polymers of the invention containing such hard monomers include: -butyl acrylate/methyl methacrylate/methacrylic acid; ethyl acrylate/methylmethacrylate/methacrylic acid and methyl acrylate/methylmethacrylate/acrylic acid.

In order to impart sufficient water solubility to the polymer, the degree of neutralization of the anionic groups with a cation such as ammonium or a Group IA metal cation employed as a base or a basic salt will vary depending on the proportion of anionic monomer used in the polymer. The metal cation may be sodium, potassium, lithium or the like; the base may be a hydroxide and the basic salt a bicarbonate, a carbonate or the like. Polymers with a high proportion of anionic monomer may require only a low degree of neutralization and, conversely, polymers with a low proportion of anionic mohomer may require a high degree of neutralization and it is possible to have 0 to 100% neutralization of the anionic monomer. Moreover, it is not necessary to over-neutralize the anionic monomer.

It may be possible to employ other metal cations in the neutralizing compound. Group II metal cations have been found to be somewhat less effective than the Group IA metal cations in providing water and detergent solution solubility for the polymer.

The proportions of monomers employed in the polymer sheet of the invention should be sufficient to provide balanced properties of rapid water solubility and satisfactory mechanical properties, such as flexible tear and dimensional stability at lower and higher relative humidities and low temperature.

In general, at least about 40% by weight of the soft monomer is employed in order to impart sufficient low temperature flexibility to the polymer sheet. It may be possible to employ less than 40% soft monomer. In that event, plasticizers are often required to provide needed flexibility to the sheet. In general, up to about 85% by weight of soft monomer can be employed. Preferably, from about 40% to 85% by weight of soft monomer is employed, and most preferably from about 60% to 80% by weight of soft monomer is employed.

In general, in order to provide the minimum desired water solubility for the polymer in laundry washes containing detergents or the like, at least about 15% up to about 100% by weight of water-soluble anionic monomer is employed. As the amount of anionic monomer employed is increased, it has been found that the neutralized polymer may become increasingly brittle, especially at lower relative humidity or low temperature. In order to provide improved low humidity flexible tear properties for the sheet, it is preferred to employ from about 15% to 50% and, more preferably, from about 15% to 40% of the water-soluble anionic monomer. For best results the ionizable groups of the anionic monomer after polymerization should be neutralized up to 100% to achieve solubility. Polymers with a low proportion of anionic monomer generally require a high degree of neutralization, and conversely, polymers with a high proportion of anionic monomer generally require a low degree of neutralization.

Where the soft monomer employed contains higher alkyl groups, such as butyl groups, usually higher levels, within the above noted range, of anionic-monomer is employed to provide satisfactory dissolution of the polymer. Under such circumstances from about 40 to 60% of anionic monomer may be employed. If desired, a portion of the anionic monomer may be substituted with a water-soluble nonionic monomer of the invention.

The water-soluble nonionic monomer of the invention can enhance the water solubihity of the addition polymer of the invention without adding thereto ionizable functionalities. In general, use of the water-soluble nonionic monomer is discretionary, particularily where the polymer sheet is not subjected to low relative humidity and/or low temperature.

In general, the particular amount of nonionic monomer employed is not critical. Usually from about 0 to 40% by weight is employed, with amounts from about 0 to 15% by weight being preferred. It is best to employ significant amounts of nonionic monomer within the broad range when soft acrylates are utilized having longer alkyl chains, such as butyl groups or 2-ethylhexyl groups.

The water-insoluble hard monomer of the invention is employed, as desired within generally broad limits. The hard monomer has been found useful td reduce the tack of the resulting polymer at high relative humidity. Substantial amounts of hard monomer are not employed, since they tend to reduce the low temperature flexibility of the polymer in sheet form. Accordingly, from about 0 to 20% by weight of hard monomer is employed.

Preferred addition polymers capable of forming self-supporting films are prepared from the following monomers having the indicated proportions:

| | | | PROPORTION BY WEIGHT PERCENT | | |
|---|---|---|---|---|---|
| SOFT MONOMER | ANIONIC MONOMER | NONIONIC MONOMER | Soft | Anionic | Nonionic |
| $C_1$–$C_4$ alkyl acrylate | Mono unsaturated carboxylic acid | hydroxy $C_1$–$C_4$ alkyl acrylate | 0–85 | 15–100 | 0–40 |

-continued

| SOFT MONOMER | ANIONIC MONOMER | NONIONIC MONOMER | PROPORTION BY WEIGHT PERCENT Soft | Anionic | Nonionic |
|---|---|---|---|---|---|
| Methyl acrylate<br>Ethyl acrylate<br>Butyl acrylate | acrylic acid<br>methacrylic acid<br>maleic acid | hydroxy $C_1$-$C_4$ alkyl methacrylate<br>acrylamide<br>N—vinyl pyrrolidone<br>vinyl acetate (hydrolyzed)<br>hydroxyethyl-methacrylate<br>hydroxyethyl-acrylate | 40-85 | 15-60 | 0-15 |

Among the factors affecting dissolvability and mechanical properties of the film is the molecular weight. In general, as its molecular weight is reduced the mechanical properties of the polymer may tend to become less desirable. Furthermore, it has been previously thought that as the molecular weight of the polymer increases and other factors such as anionic monomer level and degree of neutralization, etc., are held constant, the dissolution rate is reduced. However, it has now been found that polymers with 15% or more by weight of anionic monomer are soluble even at very high molecular weight, even though neutralized up to 100% or less. Above 15% anionic monomer the polymer dissolves at a reasonable rate even at cool wash temperatures of about 60° F. In addition, it is now possible, if desired, to improve mechanical properties by utilizing a higher molecular weight polymer without sacrificing solubility.

At high relative humidities (RH), usually above about 75% RH, sometimes encountered during storage or use it has been found that the polymer film of the invention may become more tacky. Polymer sheets may tend to stick to one another, especially when stored in a roll or other dispenser type form at high relative humidity. Accordingly, to reduce and/or eliminate that tendency, it may be desirable to employ a barrier coating on the outer surface of the polymer sheet. The barrier coating tends to act to insulate the sheet from the effects of moisture penetration under humid storage conditions.

The barrier coating employed should readily dissolve or break up when the sheet is introduced into water. In one aspect, suitable barrier coatings generally contain a film-forming hard component, a plasticizing component and an emulsifier. Typical film-forming barrier coatings include paraffin wax and glyceryl monostearate. Typical plasticizing components include lanolin and petrolatum. Typical emulsifiers include stearic acid and the like. The materials referred to above may perform multiple functions. For example, glyceryl monostearate may function both as an emulsifier and as a film-forming material, while lanolin may function both as an emulsifier and as a softener. In another aspect, suitable barrier coatings generally contain a film-forming component, a plasticizing component, and a component to reduce cross-linking. A typical film-forming component is polyvinylalcohol. Typical plasticizing components include ethoxylated aryl ether nonionic surfactants. Typical components to reduce cross-linking include ethoxylated phosphate ester anionic surfactants.

Typical barrier coatings, their method of preparation and their method of applicaton to a surface are disclosed in U.S. Pat. No. 3,322,674 issued May 30, 1967, U.S. Pat. No. 4,390,436, issued June 28, 1983 and U.S. Pat. No. 3,257,348, issued June 21, 1966. The disclosure of said patents is expressly incorporated herein by reference with regard to the constituents, preparation and application of the barrier coating.

It should be understood that the barrier coating need not be applied to the inner surface of the polymer sheet, which contacts the laundry care additives, such as a chlorine bleach. The film-forming polymer of the invention resists the oxidizing effects of reactive laundry care additives and does not require an inner barrier coating to protect either itself or the additive, from deterioration.

In order to assist in providing sufficient low temperature and/or low humidity flexibility to the polymer sheet to prevent the polymer from drying out and becoming embrittled, it may be desirable to employ a plasticizer in the polymer composition. Plasticizers are employed which are resistant to the oxidizing and other reactive effects of the laundry care additives, especially chlorine bleaches. A suitable plasticizer is glyceryl triacetate.

Such a plasticizer may be employed in conventional amounts, usually about 5 to 40 weight percent. Alternatively to reduce embrittlement it may be desirable to employ in the polymer, minor amounts of monomers having relatively low glass transition temperatures. Such monomers as butyl acrylate, 2-ethylhexyl acrylate or hydroxyethyl acrylate may be employed for that purpose.

Optionally, the polymer film could contain filler for improving physical properties, improving dissolution, reducing tackiness, increasing modulus, etc. Examples are talcs, calcium carbonate, polymeric polystyrene or fibers.

It has been found that the optional inclusion of a small amount of a solubilizer or surfactant may sometimes be helpful in aiding dissolution of the sheet during use. Suitable surfactants may be added to the polymer sheet to aid in dissolution during the wash cycle and can include conventional ones stable to bleaching agents and other reactive laundry care additives.

The active laundry care additive employed in the laundry care product of the invention may be selected from the broad range of typical washing machine additives including enzymes, bleaches, fabric softeners, builders, fabric conditioners, water softeners, wrinkle release additives, additives imparting a specific feel or hand to the laundry and detergents. A particularly useful active component is a bleaching composition which may be particulate or in wafer form.

Sufficient amounts of such laundry care additives are employed to provide an effective level when released to the wash liquor. In general, it has been found necessary to deliver from about 2 to 20 grams of additive, especially bleaching compound, to a typical wash liquor depending upon for example, the amount of available bleaching species the bleaching composition. The actual percentage of additives in the final sheet will depend upon many factors including in the size and thickness of the sheet. For typical sheets, the ratio of chlorine bleach to polymer should be from 10:1 to 1:2.

The bleaching composition of the invention is a dry chlorine type bleaching agent. The chlorine bleach may include alkali metal and alkaline earth metal hypochlorites, hypochlorite addition products, dimethyldihalohydantoin, chloramines, chlorimines, chloramides and chlorimides. Specific examples of such compounds include calcium hypochlorite chlorinated trisodium phosphate dodecahydrate, Chloramine T and sodium dichloroisocyanurate. The preferred bleaches employed are the chlorinated isocyanurates.

Other suitable bleaches include the inorganic peroxy bleaches and the organic peroxy bleaches. Typical inorganic peroxy bleaches are the alkali metal salts of perborates, persilicates, percarbonates and perphosphates. Suitable organic peroxy bleaches include urea peroxides or an organic peroxy acid or anhydride. Suitable aromatic peroxy acids and/or salts thereof include monoperoxphthalic acid and diperoxyterephthalic acid.

The most preferred dry bleaches are the sodium and potassium dichloroisocyanurates or dichloroisocyanurate dihydrates, sodium perborate monohydrate, sodium perborate tetrahydrate, sodium percarbonate and mixtures thereof.

The addition polymer of the invention is prepared by comonomer free radical polymerization, such as emulsion polymerization, solution polymerization, and photo-polymerization.

Conventional emulsion polymerization techniques are well known and are described in U.S. Pat. Nos. 2,754,280 and 2,795,564. The comonomers may be emulsified, if necessary, with an anionic or nonionic dispersing agent, about 0.5% to 10% thereof being used by weight of total monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as the catalyst system, may be used in proportions from about 0.1 to 2%, each based upon the weight of monomers to be copolymerized. The polymerization temperature maintained during the reaction may be from room temperature to about 90° C. or more.

Examples of dispersing agents, surfactants and emulsifiers suitable for the polymerization process of the invention include alkali metal and ammonium salts of alkyl, aryl, alkaryl, and aralkyl sulfonates, sulfates and polyethersulfates; the corresponding phosphates and phosphonates and ethoxylated fatty acids, esters, alcohols, amines, amides and alkylphenols.

To regulate the molecular weight of the emulsion polymers it is preferred to employ a chain transfer agent, such as a mercaptan, polymercaptan, or polyhalogen compound in the polymerization mix. Esters of mercaptoalkanoic acids are especially preferred as chain transfer agents and, particularly, butylated mercaptopropionic acid (BMPA). The chain transfer agents are used in amounts typically from about 0.2 to 2% by weight.

Conventional solution polymerization techniques are well known. Monomers and initiators are combined in a solvent-containing reactor. The solvent may be, for example, methanol for relatively low reaction temperature, and methyl isobutyl ketone or glycol ether for high reaction temperature. Temperature may be maintained up to the boiling point of the solvent chosen. A typical polymerization initiator may be of the nitrile type, and may be used from about 0.1 to 5% based on the weight of monomers to be polymerized.

Conventional photo-chemical polymerization techniques are also becoming well known. Monomers and photo-initiators are combined, generally with little or no solvent. The photo-initiator is a chemical compound which absorbs electro-magnetic energy, generally ultraviolet or visible light, and produces one or more free radicals capable of initiating polymerization. The monomer solution, with added photo-initiator, may be converted directly to polymer film by drawing the solution to the desired thickness and then passing it under a source of ultra-violet light to initiate the polymerization. Typical photo-initiators may be benzophenone or derivatives, with or without added amine synergists, or acetophenone derivatives, and may be used from about 0.01 to 5% on the weight of monomers to be polymerized. A typical source of ultra-violet light is a medium-pressure mercury vapor lamp with power of 300 watts per inch.

Polymer Preparation Example

The addition polymers of the invention may be prepared as follows:

A reactor is partially filled with deionized water and heated under nitrogen feed to a temperature from about 85°-95° C. An aqueous solution of the initiator and, optionally, emulsifiers are thereafter introduced. The reactor is then reheated to the reaction temperature, as needed, and the comonomers feed is introduced. Tne comonomers feed includes all the comonomers of the invention and the chain transfer agent. The comonomers feed is preferably a delayed feed over a period of from 1 to 2 hours. During that time the desired reactor temperature is maintained.

After all the monomers have been introduced into the reactor the polymerization mixture is held for about 45 minutes at the reaction temperature to ensure completion. Thereafter, the reaction mix is cooled and the latex filtered off. A neutralized polymer formulation is prepared by adding thereto sodium hydroxide solution or the like to neutralize the polymer to up to 100% of theoretical.

If desired, the addition polymers of the invention can also be prepared by appropriate solution polymerization techniques. Such techniques can include a delayed two hour addition of comonomers containing initiator to a Cellosolve (reaction solvent)—containing reactor at reaction temperatures of about 115° C. After the monomer feed is completed, additional initiator is added to complete polymerization.

Neutralized polymer films are prepared from high solids neutralized solutions of the polymer by casting or extruding techniques. For example, a polymer film of the invention may be prepared by drawing down a high non-volatiles (25% N.V.) neutralized polymer on a polyethylene film with a Gardner knife or the like and, thereafter, drying the polymer film for 1 hour at 95° C. The dried polymer film is peeled from the polyethylene backing and thereafter employed as a polymer sheet for retaining a laundry care additive of the invention.

If desired, the solid polymer may be recovered from a latex or a solution employing a wiped film evaporator or the like. The solid polymer may be treated with base in a Banbury-type mixer, extruded, remaining water removed by venting and the molten ionomer extruded as a sheet. A laundry care additive is dispensed to the sheet, a second sheet is placed on top of the first to form a sandwich or the first sheet folded over the additive and the resulting package heat sealed.

Again, if desired, the polymer of the invention can be prepared by appropriate photo-polymerization techniques. The chosen monomers are combined in the desired proportions, with added solvent if desired. The neutralizing base, for example sodium, lithium, or potassium hydroxide, is added in the amount needed to achieve the desired degree of neutralization of the anionic monomer. Water may be added if needed to assist in solubilizing monomer salts in the monomer solution. A surfactant, for example sodium lauryl sulfate, may be added if needed to solubilize or emulsify any of the components of the monomer solution. Plasticizer, for example glyceryl triacetate, may be added if desired to enhance mechanical properties of the polymer. The photo-initiator is dissolved in the monomer solution. The monomer solution is cast to the wet-film thickness needed to achieve the desired dry-film thickness, and is then passed under a source of ultra-violet light for a time sufficient to ensure complete polymerization. A laundry care additive is dispensed to the sheet, a second sheet is placed on top of the first to form a sandwich or the first sheet folded over the additive and the resulting package heat sealed.

It is important that the laundry care additive form a relatively thin, preferably monoparticulate layer, retained within the polymer sheets. If any pockets of additive remain on the laundry product, then upon handling, the pockets may cause the sheet material to rupture. Accordingly, the product should be formed to prevent formation of additive pockets or cells and to promote formation of a thin, monoparticulate layer of additive anchored within the product.

For that purpose the laundry care additive is uniformly dispensed to a polymer sheet, either as particles or as wafers. The polymer sheet may then be folded upon itself or a second sheet may be applied over the dispensed additive. Thereafter under relatively mild conditions of heat and pressure, the layers of sheet material containing dispersed additive are joined to themselves and to the dispersed particulate or wafered additive therein to form a unitary monolithic matrix. It is a key advantage of the present invention that the laundry product is a unitary matrix or laminate intimately anchoring and retaining the additive particles or wafers, thus preventing formation of pockets or cells of additive.

During sealing, the polymer sheet softens and flows at least in part into the interstices or voids between the additive particles or wafers, thus anchoring and retaining them against movement and permanently uniting the polymer sheet and the particles or wafers into a single unit.

In a preferred embodiment the sealing conditions and the thickness of the sheet employed is controlled to permit the film to flow substantially into the interstices between the dispersed particles or wafers. If desired, in another aspect of this invention the sealing conditions are adjusted to allow the film to completely fill the void spaces and to thereby encapsulate the particles or wafers. In another embodiment the sealing conditions are selected to allow the film to merely tack or bind the particles or wafers within the unit with little film flow into the interstices.

If desired, where laundry care additives are employed which are not water sensitive, such as certain fabric softeners and detergents, such additives can be dispersed or mixed into the latex or solution at any stage before or after polymerization is complete, and the entire mix of polymer and additive may be formed into a unitary sheet by extruding, film casting or the like. In this embodiment the additive may be embedded in the surface of, or even completely within, the sheet matrix.

For best results the product is formed by joining a folded over sheet or two sheets, containing additive therein, at temperatures preferably from about 80°-120° C. The pressure and temperature selected will depend, in part, on the identity of the monomers employed in the polymer film.

In general, a laundry product of the invention is usually from about 5 to 80 square inches in area, preferably 10 to 20 square inches, to provide adequate storage space for the additive, although larger and smaller sheets may be employed. The laundry product should be thin enough to dissolve or disperse in warm water in about 20 minutes or less. The product should be thick enough however, to provide proper support.

For these and other purposes, it is preferred that the individual polymer sheets be from about 1-10 mils, preferably 2-6 mils, in thickness. If desired, multiple layers of polymer films can be joined to form a single sheet.

The following examples are provided for illustrative purposes only and should not be deemed to be limitative of scope. In the following examples all parts and percentages are by weight unless otherwise indicated.

EXAMPLE 1

A polymer was prepared of the following composition: 94% ethyl acrylate/6% acrylic acid, neutralized to 150% of stoichiometric with 1.1 equivalents of sodium hydroxide and 0.4 equivalents of sodium bicarbonate.

900 g of de-ionized water is charged to a 2-liter flask. The water is heated under a nitrogen atmosphere to 85° C. 1.5 g of ammonium persulfate is dissolved in 50 g of de-ionized water and added to the flask; the solution is re-heated to 85° C. A monomer feed is prepared of 470 g ethyl acrylate, 30 g acrylic acid, and 5 g butylated mercaptopropionic acid. This feed is added to the flask over a 90 minute period, continuously stirring and maintaining 85° C. The latex is stirred an additional 60 minutes at 85° C., then allowed to cool to room temperature. The latex is about 34% non-volatiles. 18.32 g sodium hydroxide is dissolved in 250 g de-ionized water, then slowly added to the latex. 13.99 g sodium bicarbonate is added and stirred until dissolved. The latex is now about 29% non-volatiles, and the polymer is 150% neutralized.

The neutralized latex was drawn down onto a sheet of polyethylene film and air-dried; the dry film was about 8 mils thick. A bleach sheet was made by cutting two pieces of film 3"×4". One piece of film was placed on a sheet of silicone release paper. 3 g of sodium dichloroisocyanurate dihydrate (ACL 56, from Monsanto) was sprinkled uniformly over the film. A second piece of film was laid over the ACL 56, and a second sheet of silicone release paper was placed on top to form a sandwich. The sandwich was placed between the plates of a heated press, then heated for 30 seconds on each side at 90° C. and 15 psi, forming the bleach sheet by heat-sealing the polymer film layers together around the ACL 56 granules; the silicone release paper was removed. The bleach sheet was coated on both sides with a thin moisture-barrier coating of 4 parts stearic acid: 1 part paraffin, then lightly dusted with talc.

The bleach sheet was stored at 90° F. and 75% R.H. After one week the sheet lost 11.6% of its available chlorine; the loss after four weeks was 28.3%.

EXAMPLE 2

Polymer films were prepared as in Example 1, except that the polymers were neutralized to 110%, 130% and 150%, respectively, with lithium hydroxide. Bleach sheets were prepared from these films as in Example 1, using 5 g ACL 56 per 3"×4" sheet. The sheets were stored at 90° F. and 75% R.H. The sheet neutralized to 110% lost 14.4% of its available chlorine after 7 days; the 130% sample lost 14.1% after 6 days (or about 16.4% at 7 days); the 150% sample lost 17.4% after 7 days. The chlorine stability of the bleach sheet clearly decreases with increasing pH and degree of neutralization.

EXAMPLE 3

A series of polymers of composition 84% ethyl acrylate/10% hydroxyethylmethacrylate/6% acrylic acid was prepared by the procedure of Example 1; the amount of BMPA was varied so as to vary the molecular weight; all polymers were neutralized to 120% with sodium hydroxide. The following results were recorded:

| (1) Molecular Weight | BMPA, as % of Polymer | pH | (2) Dry Film Tear | Solubility @ 60° F. |
|---|---|---|---|---|
| 20,490 | 2.00 | 10.00 | 4 | Dissolved in 45 seconds |
| 25,490 | 1.50 | 10.20 | 3 | Fine particles in 135 seconds |
| 29,170 | 1.00 | 9.76 | 2 | Dissolved in 120 seconds |
| 46,230 | 0.75 | 8.81 | 1 | Flakes after 600 seconds |
| 62,390 | 0.50 | 9.05 | 1 | Small and large flakes |
| >103,200 | 0 | 10.00 | 1 | Largely intact, some medium flakes |

(1) Weight average molecular weight as measured by GPC. The highest sample had much insoluble matter, so molecular weight is higher than 103,200.
(2) Dry film tear is measured by slowly stretching a dried polymer film and observing the nature of the tear which occurs. Generally there initially occurs a uniform increase in the size of the tear followed by a sudden rupture. Lower values show greater elongation before rupture, and are more desirable.

These results clearly show that polymer film properties improve as molecular weight increases. They also clearly show that, even with over-neutralization of the polymer, it is nearly impossible to maintain polymer solubility with increasing molecular weight at low proportions of water-soluble anionic monomer.

EXAMPLE 4

A polymer was prepared of the following composition: 40% ethyl acrylate/40% butyl acrylate/20% acrylic acid, neutralized to 95% of stoichiometric with sodium hydroxide.

To a 3-liter flak equipped with a dropping funnel and condenser, charge 750 g methanol, 40 g ethyl acrylate, 40 g butyl acrylate, and 20 g acrylic acid. Start heating under nitrogen atmosphere to reflux. While heating, but before reflux, charge 0.2 g 2,2'-azobis (isobutyronitrile) (Vazo 64, DuPont) dissolved in 50 g methanol. Maintain reflux 15 minutes, then start dropwise addition of monomer feed consisting of 200 g methanol, 160 g ethyl acrylate, 160 g butyl acrylate, 80 g acrylic acid, and 0.7 g Vazo 64; monomers should be added over a 90–100 minute period. Maintain reflux another 90 minutes, then add 0.5 g Vazo 64 in 10 g methanol. Continue stirring and reflux under nitrogen for total of 24 hours, add 90 g of methanol, and cool to room temperature. Polymer solution is now about 31.2% non-volatiles. The polymer is neutralized by slowly adding 52.7 g sodium hydroxide in 400 g de-ionized $H_2O$. The polymer solution is now about 25% non-volatiles. The weight average molecular weight was 217,830.

A polymer film and bleach sheet were prepared as in Example 1 with 2.5 g ACL 56 per 2"×3" sheet; no coating was applied. The film is strong and flexible, and is soluble in 60° F. tap water. The bleach sheet was stored at 90° F. and 75% R.H.; after 1 week it lost 0.8% of its available chlorine, and after 4 weeks it lost only 3.3%.

Clearly, using a higher proportion of anionic monomer has given several significant improvements over prior polymers:

- higher molecular weight gives good film properties
- suprisingly, the polymer is very soluble even though it has high molecular weight and is neutralized less than completely
- the bleach sheet is dramatically improved as to chlorine stability compared to prior polymers.

EXAMPLE 5

A series of polymers were prepared, as outlined in the table below. Emulsion polymers were prepared by the technique of Example 1; solution polymers were prepared as in Example 4. All polymers were neutralized, as specified in the table below, by dissolving the base in sufficient de-ionized water to reduce the final polymer concentration to 20–25% by weight and adding the base solution to the polymer solution. Polymer films were prepared as in Example 1, with thickness 5–10 mils. Some of the bleach sheets were prepared as in Example 1, with 5.0 g ACL 56 granules per 3"×4" sheet. Other of the bleach sheets were heat-sealed in the same manner, ut the ACL 56 was used as six 0.95 gram portions per 3"×4" sheet, each portion having been pressed in a tablet press into a wafer 25 mm diameter by 1.2 mm thick, the wafers uniformly spaced over the sheet. None of the bleach sheets had a moisture-barrier coating.

| (1) Polymer Composition | Process | Molecular Weight, Weight Average | Degree Neutralized | Solubility 60° F. | ACL 56 Form, Wafer of Granule | Chlorine Loss at 90° F. and 75% R.H. 1 week | 4 weeks |
|---|---|---|---|---|---|---|---|
| 40 EA/40 BA/20 AA | Emulsion | Unknown | 95%, NaOH | Complete | Granule | 7.2% | 8.6% |
| 40 EA/40 BA/20 AA | Emulsion | 34,130 | 95%, NaOH | Complete | Granule | 4.3% | 11.9% |
| 40 EA/40 BA/20 AA | Emulsion | 34,130 | 95%, LiOH | Complete | Granule | 2.9% | 8.8% |
| 80 EA/20 AA | Emulsion | 34,430 | 40%, NaOH | Complete | Granule | 1.0% | 4.3% |

-continued

| (1) Polymer Composition | Process | Molecular Weight, Weight Average | Degree Neutralized | Solubility 60° F. | ACL 56 Form, Wafer of Granule | Chlorine Loss at 90° F. and 75% R.H. 1 week | 4 weeks |
|---|---|---|---|---|---|---|---|
| 40 EA/40 BA/20 AA | Solution | 217,830 | 95%, NaOH | Complete | Granule | 0 | — |
| 40 EA/40 BA/20 AA | Solution | 217,830 | 95%, NaOH | Complete | Wafer | — | 1.8% |
| 70 BA/30 AA | Solution | 239,630 | 90%, NaOH | Complete | Granule | 2.5% | — |
| 70 BA/30 AA | Solution | 239,630 | 90%, NaOH | Complete | Wafer | — | 2.9% |
| 60 BA/40 AA | Solution | 145,800 | 65%, NaOH | Complete | Granule | 0.6% | — |
| 60 BA/40 AA | Solution | 145,800 | 65%, NaOH | Complete | Wafer | — | 3.8% |
| (2) 100 AA | Unknown | 240,000 | 0 | Complete | Granule | — | 7.4% |
| (2) 100 AA | Unknown | 240,000 | 25%, LiOH | Complete | Granule | — | 8.5% |

(1) EA = ethyl acrylate
BA = butyl acrylate
AA = acrylic acid
(2) The 100 AA polymer is a homopolymer of acrylic acid with weight average molecular weight = 240,000, supplied as a solution of 25% solids in water (Good-rite K-702, from B. F. Goodrich).

These results clearly show the heretofore unrecognized advantages of making bleach sheets from polymers which have greater than 15% anionic monomer. These polymers are completely soluble, even at 60° F., regardless of molecular weight, even though they may be less than 100% neutralized. Furthermore, by using such polymers, there has been achieved a substantial reduction in the loss of chlorine during storage, particularly at high temperature and humidity.

EXAMPLE 6

A polymer was prepared having this composition: 60% butyl acrylate/40% acrylic acid, neutralized to 50% of stoichiometric with sodium hydroxide.

To a 3-liter flask equipped with a dropping funnel and condenser, charge this initial monomer blend: 60 g butyl acrylate, 40 g acrylic acid, 575 g methanol, and 0.12 g Vazo 64. Under nitrogen atmosphere heat to reflux. Agitate at reflux for 15 minutes, then over a 90 minute period add this monomer feed: 240 g butyl acrylate, 160 g acrylic acid, 250 g methanol, and 0.50 g Vazo 64. Agitate at reflux under nitrogen for another 90 minutes, then over a final 30 minute period add the final initiator feed: 100 g methanol, 0.20 g Vazo 64. Continue to agitate at reflux for 20 hours after the final feed, then cool to romm temperature. The unneutralized polymer solution will be about 35% solids. The weight average molecular weight is 145,800.

The polymer is neutralized to 50% of stoichiometric by slowly adding 1387.7 g of 4.0% aqueous solution of sodium hydroxide. The partially-neutralized polymer solution is now about 18% solids. A plasticizer is added by adding 50 g glyceryl triacetate to the solution.

Polymer film and bleach sheets were prepared as described in Example 1, using 5.0 g ACL 56 granules per 3"×4" sheet. The film is flexible at room temperature, and is completely soluble in 60° F. tap water. Bleach sheets were stored at 90° F. and 75% R.H. After 2 weeks there was 6.0% loss of available chlorine.

Additional bleach sheets were made, using ACL 56 wafers rather than granules. Each 3×4" sheet has 6 wafers, each containing 0.93 g ACL 56 and measuring 25 mm diameter by 1.2 mm thick; wafers are made in a conventional rotary tablet press. Wafer-containing bleach sheets are heat-sealed as in Example 1, sealing for 5 seconds at 250° F. and 40 psi. The bleach sheets were stored at 90° F. and 75% R.H.; after 4 weeks there was 3.4% loss of available chlorine, and after 8 weeks the loss was 7.0%.

EXAMPLE 7

A polymer was prepared using the same composition and technique as Example 6, except that it was made with overall batch size 100 lbs. at 35% solids. The resulting un-neutralized polymer had weight average molecular weight about 350,000. It was neutralized to 50% of stoichiometric with sodium hydroxide solution using the procedure of Example 6. 7 lbs. of glyceryl triacetate was added as a plasticizer. Film was cast and air-dried as in Example 1, to a dry film thickness of 5 mils. The film is completely soluble in 60° F. tap water.

An anti-tack coating was applied to one side of the film to prevent tackiness which may develop at high temperature and humidity. The coating is 75% partially hydrolyzed polyvinylalcohol (Vinol 205, from Air Products), 10% nonionic polyoxyethylene arylether (Pycal 94, from I.C.I.), and 15% anionic phosphate ester (Gafac LO 529, from G.A.F.). It is prepared as a 25% solution in water, rolled onto the film with a #16 wire-wound rod, and air-dried.

Wafer-containing bleach sheets containing 6 wafers in each 3"×4" bleach sheet were made as in Example 6, except that each wafer contained 0.833 g ACL 56, 0.151 g sodium acid pyrophosphate, 0.010 g magnesium stearate, and 0.006 g of a fluorescent whitening agent (Tinopal CBS-X, from Ciba-Geigy); sheets are made such that the coating on the film is at the outside of the bleach sheet.

Both the film and the bleach sheet are completely soluble in 60° F. tap water, and are very flexible even after 24 hours in a refrigerator at 40° F. Bleach sheets were stored at 90° F. and 75% R.H.; after 1 week there was 0.8% loss of available chlorine, and after 2 weeks the loss was only 3.0%.

EXAMPLE 8

A polymer was prepared having the following composition: 60% butyl acrylate/40% acrylic acid, neutralized to 70% of stoichiometric with potassium hydroxide.

An initial monomer solution is prepared by combining 60 g butyl acrylate, 40 g acrylic acid, 20 g methanol, 21.7 g potassium hydroxide, 3.0 g sodium lauryl sulfate, and 0.10 g 2,2-dimethoxy-2-phenyl-acetophenone (a photoinitiator, Irgacure 651 from Ciba-Geigy). To 50 g of this solution is added as a thickener 15 g of the unneutralized polymer solution prepared as in Example 7 (except made at 45% solids) and 1.4 g additional potassium hydroxide; the monomer solution is quite viscous. The monomer solution is drawn with a Gardner knife on a glass plate to a film thickness about 4 mils, then passed under a 300 watt-per-inch medium pressure mercury vapor lamp at a speed of 45 feet-per-minute to produce the completely cured film. The resulting film is 4 mils thick, is very tough and flexible, and is completely soluble is 60° F. tap water.

What is claimed is:

1. A water-soluble sheet for delivering laundry care additives containing bleaches, which sheet comprises a self-supporting water-soluble film of an addition polymer formed of:

(a) from about 0 to 85% by weight of a water-insoluble soft monomer;

(b) from about 15 to 60% by weight of a water-soluble anionic monomer;

(c) from about 0 to 25% by weight of a water-soluble nonionic monomer; and (d) from about 0 to 40% by weight of a water-insoluble hard monomer, wherein said addition polymer is up to about 100% neutralized with a Group IA metal base or a Group IA metal basic salt.

2. The sheet of claim 1 in which the addition polymer is a polymer of from about 40–85% by weight of said water-insoluble soft monomer, from about 15 to 60% by weight of said water-soluble anionic monomer and from about 0 to 15% by weight of said water-soluble nonionic monomer and is neutralized up to about 100%.

3. The sheet of claim 1 in which the water-insoluble soft monomer is a $C_1$ to $C_8$ alkyl acrylate or a $C_5$ to $C_{18}$ alkyl methacrylate.

4. The sheet of claim 1 in which the anionic monomer is selected from the group consisting of methacrylic acid and acrylic acid.

5. The sheet of claim 2 in which the nonionic monomer is selected from hydroxyalkyl acrylates or methacrylates having an alkyl group with from 2–6 carbon atoms to which the hydroxy group is attached.

6. A laundry care product which comprises at least one wafer of bleaching agent carried by the sheet of claim 1.

7. A laundry care product which comprises particles of bleaching agent carried by the sheet of claim 1.

8. A laundry care product which comprises a substantially uniform layer of dispersed particles of bleaching agent contained within a unit formed from the sheet of claim 1.

9. A laundry care product which comprises a substantially uniform layer of dispersed wafers of bleaching agent contained within a unit formed from the sheet of claim 1.

10. A laundry care product comprising a pair of sheets of the film of claim 1 which contain said bleaching agent.

11. The product of claim 10 in which an outer surface of each sheet contains a moisture barrier coating thereon, whereby said laundry care product is provided with enhanced humidity resistance.

12. The product of claim 10 in which the laundry care additive is a dry bleaching agent selected from the group consisting of alkali metal and alkaline earth metal hypochlorites, hypochlorite addition products, dimethyldihalohydantoin, chlorinated isocyanurates, chloramines, chlorimines, chloramides and chlorimides.

13. The product of claim 12 in which the weight ratio of said bleach to said polymer is from about 10:1 to 1:2.

14. Process for forming a water-soluble laundry care product which comprises:

(a) forming a unit by surrounding a substnatially uniform layer of dispersed wafers or particles of bleaching agent with at least one sheet according to claim 1; and (b) sealing said unit in such a manner that all sheets present in said unit completely surround and contain said layer to form a unitary monolithic matrix.

15. A laundry care product, which comprises:

(a) at least one sheet according to claim 1; and (b) said bleaching agent.

16. The sheet of claim 1 wherein the film consists essentially of said (a), (b) and (d).

17. The sheet of claim 3 wherein the film consists essentially of said (a), (b) and (d).

18. The laundry care product of claim 6 wherein the film consists essentially of said (a), (b) and (d).

19. The laundry care product of claim 7 wherein the film consists essentially of said (a), (b) and (d).

20. The laundry care product of claim 10 wherein the film consists essentially of said (a), (b) and (d).

21. The process of claim 14 wherein the film consists essentially of said (a), (b) and (d).

22. The laundry care product of claim 15 wherein the film consists essentially of said (a), (b) and (d).

* * * * *